United States Patent [19]

Harada

[11] 4,430,419

[45] Feb. 7, 1984

[54] POSITIVE RESIST AND METHOD FOR MANUFACTURING A PATTERN THEREOF

[75] Inventor: Katsuhiro Harada, Mito, Japan

[73] Assignee: Nippon Telegraph & Telephone Public Corporation, Tokyo, Japan

[21] Appl. No.: 339,414

[22] Filed: Jan. 15, 1982

[30] Foreign Application Priority Data

Jan. 22, 1981 [JP] Japan ................................. 56-8266
Sep. 4, 1981 [JP] Japan ............................. 56-139353

[51] Int. Cl.$^3$ .............................................. G03C 5/00
[52] U.S. Cl. .................................... 430/296; 430/326; 430/330; 430/327; 430/967; 430/966; 430/908
[58] Field of Search ............... 430/296, 908, 966, 967, 430/323, 326, 330, 327; 427/34

[56] References Cited

U.S. PATENT DOCUMENTS 3,535,137 10/1970 Haller et al. ..................... 430/296
3,984,582 10/1976 Feder et al. ...................... 430/330

OTHER PUBLICATIONS

Yun et al.—*The Copolymerization of Phenyl Methacrylate With Methacrylic Acid*, Vysokomol. soyed. A12—No. 11, 2820–2825, 1970.
E. Gipstein et al., Parameters Affecting the Electron Beam Sensitivity of Poly(methyl methacrylate), IBM J. Res. Develop., Mar. 1977–pp. 143, 150 and 151.

*Primary Examiner*—Won H. Louie, Jr.
*Attorney, Agent, or Firm*—Frishauf, Holtz, Goodman & Woodward

[57] ABSTRACT

The invention provides a positive resist comprising a copolymer of 60 to 90 mol % of phenylmethacrylate and 40 to 10 mol % of methacrylic acid.

The invention also provides a method for forming a pattern of a positive resist comprising the steps of:

forming on a substrate a film of a positive resist which comprises a copolymer of 60 to 90% of phenylmethacrylate and 40 to 10 mol % of methacrylic acid;

pre-baking said positive resist film to cross-link said copolymer;

selectively radiating said positive resist film which has been pre-baked with a high energy beam to form a latent image; and developing said latent image with a developing solvent. Said positive resist has excellent resistance to dry etching and high sensitivity, and shows good adhesion to a substrate and can realize high resolution.

11 Claims, 8 Drawing Figures

POSITIVE RESIST AND METHOD FOR MANUFACTURING A PATTERN THEREOF

BACKGROUND OF THE INVENTION

The present invention relates to a positive resist which is used for manufacturing semiconductor devices and to a method for forming a pattern of the positive resist on a substrate.

When the conventional wet etching method is adopted in fine processing involving a pattern dimension of less than several microns as in the case of ICs and LSIs, the amount of undercutting cannot be ignored in relation to processing precision. Therefore, the dry etching method is more widely adopted because of its anisotropic etching without under cutting. Due to this trend, it is important that the resist material used for such fine processing has the resistance to dry etching so as to suppress the thickness reduction of the resist film under the dry etching atmosphere and to prevent the pattern deformation.

Both the resistance to dry etching and the sensitivity to radiation of the positive resist material are correlated with the tendency to dissociate the main chain of the polymer constituting the resist. Since these two properties have opposite tendencies, a positive resist material which satisfies the requirements for both of these properties therefore has not been realized. At the current stage, we must select between a positive resist material which has high sensitivity to radiation but which has low resistance to dry etching, and a positive resist material which has high resistance to dry etching but which has low sensitivity to radiation.

Polyphenylmethacrylate, polybenzylmethacrylate or the like, which is polymethacrylate having a benzene ring as the side chain, is known to have high resistance to dry etching because of its shield effect. However, these substances have low sensitivity to radiation with electron beam or X-ray because of these low G-Value for main chain scission. In addition, these substances have a smaller change in the dissolution ratio in a developer with changes in the molecular weight. Therefore, when a high-sensitivity developer which uses a good solvent with a greater tendency to dissolve the resist is used, resolution is degraded, resulting in low sensitivity.

For example, polyphenylmethacrylate is reported to exhibit a sensitivity of 155 $\mu C/cm^2$ (see "H. Saeki, 39th meeting of the Japan Soc. of Appl. Phys. 3a-E-7, P92 (1978)"). The sensitivity mentioned is lower than that of PMMA.

SUMMARY OF THE INVENTION

It is an object of the present invention to provide a positive resist which has excellent resistance to dry etching and high sensitivity, which can realize high resolution, and which has good adhesion to a substrate, and to provide a method for forming a pattern of this resist on the substrate.

In order to achieve the above object, there is provided according to an aspect of the present invention a positive resist comprising a copolymer of 60 to 90 mol% of phenylmethacrylate and 40 to 10 mol% of methacrylic acid.

According to another aspect of the present invention, there is provided a method for forming a pattern of a positive resist comprising the steps of:

forming on a substrate a film of a positive resist which comprises a copolymer of 60 to 90 mol% of phenylmethacrylate and 40 to 10 mol% of methacrylic acid;

pre-baking said positive resist film to cross-link said copolymer;

selectively radiating said positive resist film which has been pre-baked with a high energy beam to form a latent image; and developing said latent image with a developing solvent.

DETAILED DESCRIPTION OF THE PREFERRED EMBODIMENTS

A copolymer constituting a positive resist of the present invention is dissolved in a suitable solvent such as monochlorobenzene, methylisobutyl ketone, xylene, 1,4-dioxane, or a mixture thereof. The mixture obtained is then applied on the surface of an object to be processed, in a uniform thickness to form a positive resist film. According to the present invention, the annealing of the positive resist film thus obtained is called pre-baking. When the copolymer represented by structural formula (1):

(where, n=0.6~0.9 and m=0.4~0.1) is annealed or pre-baked, the cross-linking between the molecules occurs due to the dehydration of the carboxylic acid groups. Then, a copolymer which is cross-linked and which is represented by structural formula (2) below is obtained:

(where, $n = 0.6 \sim 0.9$ and $m = 0.4 \sim 0.1$). The resist made of this cross-linked copolymer becomes insoluble in the developing solvent. However, when the resist is selectively radiated with an energy such as an electron beam or an X-ray, the radiated part of the resist decomposes to form a latent image. Subsequently, the radiated part of the resist is removed by dissolution by the developing solvent, while the unradiated part of the resist remains. In this manner, developing is completed, leaving a desired resist pattern on the substrate. When the substrate, that is, the object to be processed is dry-etched using this resist pattern as a mask, the resist pattern has high resistance to dry etching since the resist has a molecular structure involving the benzene ring. Furthermore, since the resist has the benzene ring and the cross-linked structure, it exhibits excellent stability against heat. Therefore, deformation or swelling of the resist film in the developing solvent which has a strong ability to dissolve the resist, is suppressed to the minimum, so that high resolution is attained. According to the resist of the present invention, the part of the resist which is not radiated is not dissolved by the strong developing solvent, and the part of the resist which is decomposed by the slight radiation is dissolved in this solvent, so that high sensitivity to the radiation may be attained. With the resist of the present invention which is applied on the substrate, carboxylic acid in the molecule has excellent affinity with the substrate, so that the resist has excellent adhesion with the substrate.

The developing solvent to be used according to the present invention is preferably a mixture of a good solvent and a poor solvent. The good solvents described above may include 1,4-dioxane, tetrahydrofuran, dimethylformamide, monochlorobenzene, dichloroethyl ether, isoamyl acetate, and methyl cellosolve, whereas the poor solvents may include diisobutyl ketone and n-hexane.

The temperature of annealing or pre-baking must be changed according to the composition of the copolymer constituting the positive resist, the type and composition of the developing solvent and the heating time. If the pre-baking temperature is too low, the inter-molecular cross-linking of the copolymer is not sufficiently effected, and the part of the resist which is not radiated with the energy beam may dissolve in the solvent in a following step.

On the other hand, if the pre-baking temperature is too high, the intermolecular crosslinking occurs so much as not to be negligible compared with the number of decompositions with radiation, resulting in reduction of sensitivity.

As an example, resist films were prepared by applying on a substrate a positive resist of the present invention consisting of 70 mol% of phenylmethacrylate and 30 mol% of methacrylic acid. These resist films were pre-baked at various temperatures and for various periods of time, and were then immersed in a developing solvent consisting of 25% by volume of dioxane and 75% by volume of diisobutyl ketone. The amount of the resist film dissolved in the solvent was determined, and then the dissolving rate for each resist film was calculated. The dissolving rates for the resist films when the pre-baking temperatures were 160° C., 180° C. and 200° C. for a pre-baking time of 60 minutes were 400 Å/min, 350 Å/min and 0 Å/min, respectively. The dissolving rates for the resist films when the pre-baking temperatures were 160° C., 180° C., 200° C. and 220° C. for a pre-baking time of 30 minutes were 475 Å/min, 375 Å/min, 275 Å/min and 0 Å/min, respectively. When the pre-baking time is 60 minutes, in order to cause sufficient cross-linking of the resist film, that is, in order to keep the dissolving rate of the resist film in the solvent at zero, it is thus seen that the pre-baking temperature must be 200° C. or higher. When the pre-baking time is 30 minutes, in order to perform sufficient cross-linking of the resist film, it is seen that the pre-baking time must be 220° C. or higher.

Incidentally, if the thermal crosslinking occurs excessively, it is necessary to increase the energy required for decomposition of the crosslinkage. In the case of using a developing solution consisting of 25% by volume of dioxane and 75% by volume of diisobutyl ketone, the heat treatment at 200° C. for 60 minutes or at 220° C. for 30 minutes gives the greatest sensitivity.

The benzene ring-containing phenylmethacrylate-methacrylic acid copolymer of the present invention may be manufactured by the conventional method such as bulk polymerization, solution polymerization, and emulsion polymerization.

The control of the composition ratio of the benzene ring-containing methacrylate to the methacrylic acid of the copolymer is most conveniently performed by the polymerization charging ratio method. In this case, the composition ratio of the copolymer may be controlled by the homopolymer molar ratio when the materials are charged for polymerization. The control of the molecular weight of the copolymer of the present invention may be relatively easily performed by adjusting the concentration of the polymerization initiator and the polymerization temperature.

In the present invention, the copolymer is subjected to intermolecular crosslinking before the actual use, with the result that the effect of the molecular weight before the crosslinking is substantially negligible. Thus, it suffices to determine the molecular weight of the copolymer in view of, for example, the resist filtering property and coating property. In general, the copolymer used in the present invention has a molecular weight Mw of about $7 \times 10^3$ to $7 \times 10^7$.

The resist of the copolymer of the present invention is applied to the surface of the object to be processed and is then pre-baked to effect inter-molecular crosslinking by production of the acid anhydride from the reaction of two molecules of the carboxylic acid. Then, the resistance of the resist to the developing solvent is improved, so that swelling and deformation tend to occur less frequently and high sensitivity is realized. These effects of the present invention may be sufficiently exhibited when 40 to 10 mol% of a methacrylic acid component is used for the compolymer. When the amount of the methacrylic acid component exceeds 40 mol%, the sensitivity and the resistance to dry etching are degraded. On the other hand, when the amount of the methacrylic acid component is less than 10 mol%, the resolution and resistance to heat are degraded. In particular, when the amount of the methacrylic acid component is about 30 mol%, a resist of balanced properties such as sensitivity, resolution, resistance to heat, and resistance to dry etching may be obtained.

The present invention will now be described by way of its examples.

EXAMPLE 1

Figure 1:
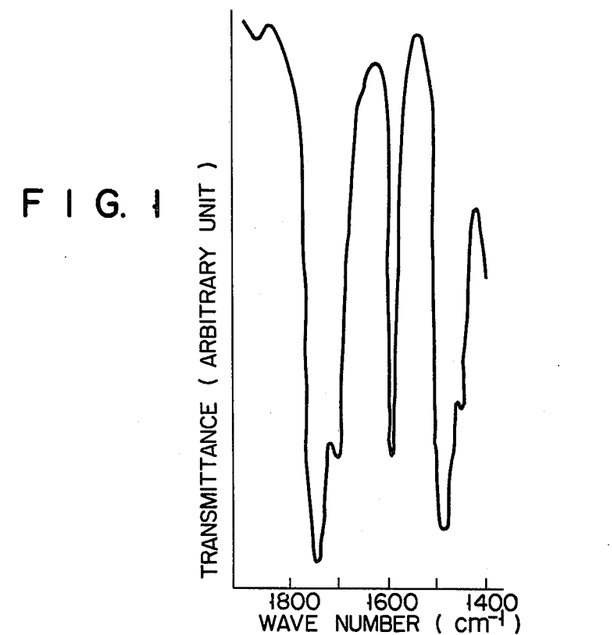
FIG. 1 shows the infrared absorption spectrum according to an embodiment of the present invention.

To a mixture of 30 parts by weight of refined phenylmethacrylate, 3 parts by weight of methacrylic acid and 50 parts by weight of toluene was added 0.05% of azobisisobutyronitrile as the polymerization initiator based on the total weight of the homopolymers. After the mixture was sufficiently deaerated, the mixture was sealed in a glass tube where it was polymerized at 50° C. for 10 hours. The mixture was then injected into a large amount of n-hexane to provide a copolymer. Then the copolymer was refined several times by the conventional method. The infrared absorption spectra of the copolymers were measured, and the results obtained are as shown in FIG. 1. According to the calibration curve obtained from the phenyl group absorption (1590 cm$^{-1}$) and the carbonyl group absorption (1704 cm$^{-1}$) of the infrared absorption spectrum of the resist obtained by mixing in a suitable ratio homopolymers of polyphenylmethacrylate and polyacrylic acid, the composition weight ratio of phenylmethacrylate and methacrylic acid was about 91.7:8.3. The molar ratio of phenylmethacrylate to methacrylic acid in the copolymer was found to be 70:30 as measured from the ratio of methyl, methylene hydrogen and benzene ring hydrogen of the proton NMR analysis method. Used hereinafter is the molar ratio as determined by the proton NMR analysis method. When the molecular weight of the copolymer obtained was measured by gel permeation chromatography, the weight average molecular weight Mw was determined to be $3.1 \times 10^6$ and the molecular weight dispersion $\overline{Mw}/\overline{Mm}$ was measured to be 3.7.

The copolymer of the resist of the present invention thus obtained was dissolved in a concentration of 5% in a solvent mixture consisting of 1 part by volume of monochlorobenzene and 1 part by volume of methyisobutyl ketone to prepare a resist solution. The resist solution thus obtained was spin-coated on a silicon wafer with a thermally oxidized surface to form a uniform resist film of about 1 μm thickness. The resist film was then subjected to pre-baking at 200° C. for one hour.

The resist film was then radiated with an electron beam for development to provide a substrate on which a desired resist film pattern was formed.

Figure 2:
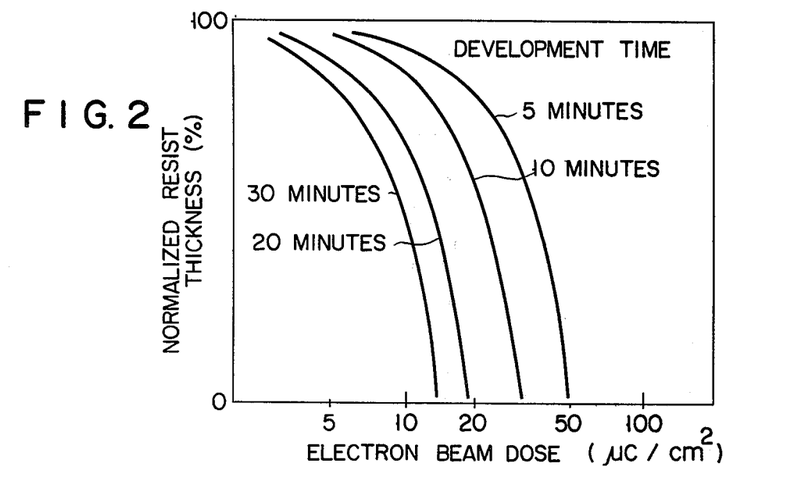
FIG. 2 is a graph showing the sensitivity curve when the positive resist film according to one embodiment of the present invention is radiated with the electron beam and developed.

FIG. 2 shows the sensitivity curve to an electron beam of the resist film obtained from the copolymer of the present invention. In this case, developing was performed at 20° C. by immersing the resist film in a solvent mixture consisting of 7 parts by volume of monochlorobenzene and 13 parts by volume of diisobutyl ketone.

The substrates with the resist patterns formed thereon in Example 1 were dry-etched. These substrates were heat-treated (i.e. post-baking) at 100° C. for 30 minutes to obtain samples. These samples were then subjected to the tunnel-type plasma etching (method A) using CF$_4$ gas containing 5% oxygen, the parallel flat plate-type reactive sputtering etching (method B) using CF$_4$ gas containing 5% oxygen, and the parallel flat plate-type reactive sputtering etching (method C) using CCl$_4$ gas under the same conditions as respective method. The rate of decrease in the thicknesses of the resist films was measured. The rate ratios to comparative example obtained are shown in Table 1.

For the purpose of comparison, a film of 1 μm thickness of polymethylacrylate (weight average molecular weight $\overline{Mw} = 3.7 \times 10^5$; molecular weight dispersion $\overline{Mw}/\overline{Mm} = 2.8$) well known as an electron beam resist was formed. The resist film thus obtained was pre-baked at 170° C. for 30 minutes. After radiation with an electron beam, the resist film was immersed for 2 minutes in a solvent mixture consisting of 1 part by volume of methylisobutyl ketone and 1 part by volume of isopropylalcohol for development. Thereafter, the resist film was pre-baked again at 100° C. for 30 minutes to provide a sample. This sample was etched in a similar manner to the sample of the present invention, and the rate of decrease in the thickness of the resist film was measured.

TABLE 1

|  | Method A | Method B | Method C |
| --- | --- | --- | --- |
| Comparative Example | 1.0 | 1.0 | 1.0 |
| Example (1) | 0.3 | 0.5 | 0.6 |

As may be seen from Table 1 above, when the resist material of the present invention is used, the rate of decrease in the thickness of the resist film is extremely small, and high resistance to dry etching can be obtained.

The copolymer of the present invention and conventional phenylmethacrylate (weight average molecular weight $\overline{Mw} = 1.1 \times 10^6$ as determined by gel permeation chromatography; molecular weight dispersion $\overline{Mw}/\overline{Mm} = 2.6$) were pre-baked in the manner as described above. The obtained results are as follows.

Figure 3:
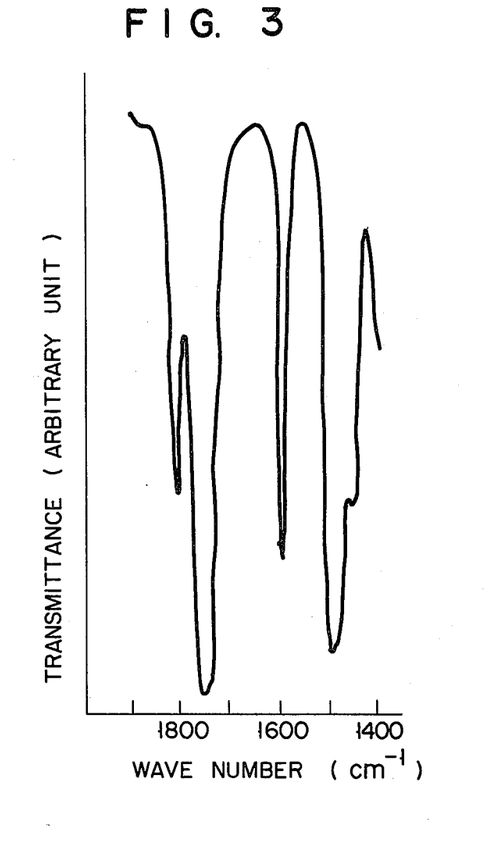
FIG. 3 shows the infrared absorption spectrum when the copolymer of the present invention is pre-baked.

The infrared absorption spectrum of the copolymer of the present invention after pre-baking at 200° C. for one hour is as shown in FIG. 3, wherein absorption by carbonyl at the wavelength of about 1704 cm$^{-1}$ disappears while absorption appears at the wavelength of about 1805 cm$^{-1}$. This absorption spectrum at the wavelength of 1805 cm$^{-1}$ is identified as the formation of an acid anhydride from two —COOH groups in the polymer. Even when this resist film was left to stand in the air for 10 days, the spectrum did not change.

Figure 4:
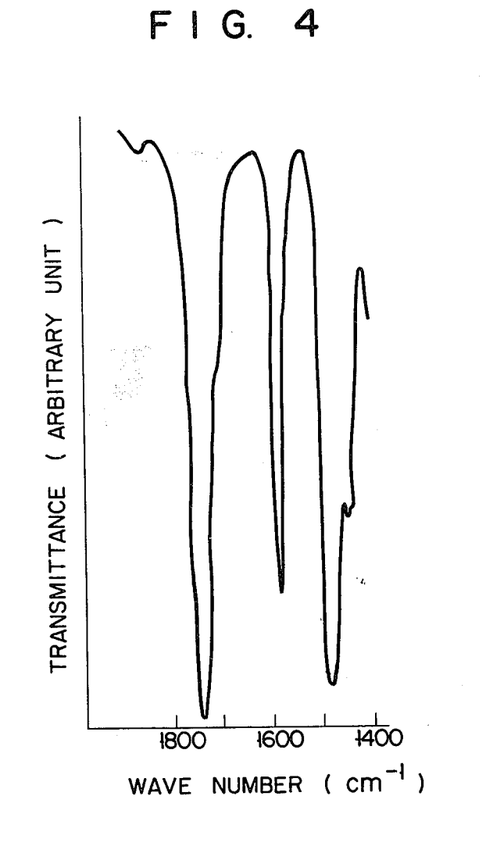
FIG. 4 shows the infrared absorption spectrum when conventional polyphenylmethacrylate is pre-baked.

However, with the conventional polyphenylacrylate polymer, the infrared absorption spectrum obtained before pre-baking was the same as that after pre-baking at 200° C. for one hour as shown in FIG. 4, indicating that an acid anhydride was not formed.

Figure 5:
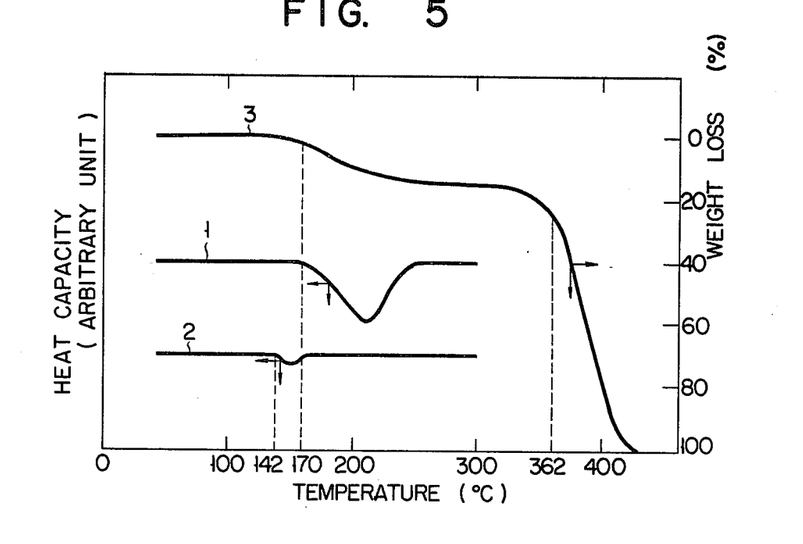
FIG. 5 is a graph showing the results of the differential thermal analysis and weight thermal analysis applied to a positive resist according to one embodiment of the present invention.

FIG. 5 is a graph showing the results of the differential thermal analysis and weight thermal analysis applied to the phenylmethacrylate-methacrylic acid copolymer of the present invention. Referring to FIG. 5, with curve 1, the heat absorption reaction peak of the acid anhydride formation reaction is obtained upon first heating of the differential thermal analysis. For curve 2, after the copolymer was heated to 300° C. once and kept at this temperature for 10 minutes, the copolymer was then cooled and heated again. With curve 2, the glass transition point is obtained at 142° C. With curve 3 representing the weight thermal analysis, about 15% of weight reduction occurs once around 170° C. and, then, thermal decomposition occurs around 362° C. It is known that the glass transition point of polyphenylmethacrylate is 110° C. (see "S. KRAUSE, J. J. GORMLEY, N. ROMAN, J. A. Shetter. and W. H. WATANABE, J. Polym, Sci., 3 pp. 3573~3586 (1965)"). Since the glass transition point of the copolymer of the present invention is as high as 142° C., the copolymer may not cause pattern deformation or the like even if it is subjected to high temperature during the manufacture of LSIs, for example.

Therefore, the conditions for formation of the acid anhydride are determined by the content of the methacrylic acid in the copolymer and the pre-baking conditions. Although the acid anhydride may be produced even if the content of methacrylic acid is 10 mol% or less, its amount is very small and good results may not be expected. On the other hand, when the amount of methacrylic acid exceeds 40 mol% or more, resistance to dry etching and sensitivity are degraded. Therefore, the content of methacrylic acid is preferably within the range of 10 to 40 mol%.

In this manner, by pre-baking the resist material according to the present invention, cross-linking by the formation of the acid anhydride is effected between the polymers, and the glass transition point is raised. Therefore, when the resist film is formed from this material, the resist film is less subject to dissolution and swelling in the solvent. Even if the resist film is developed in a strong developing solution for a long period of time as shown in FIG. 2, resolution is not degraded and high sensitivity is attained.

Figure 6:
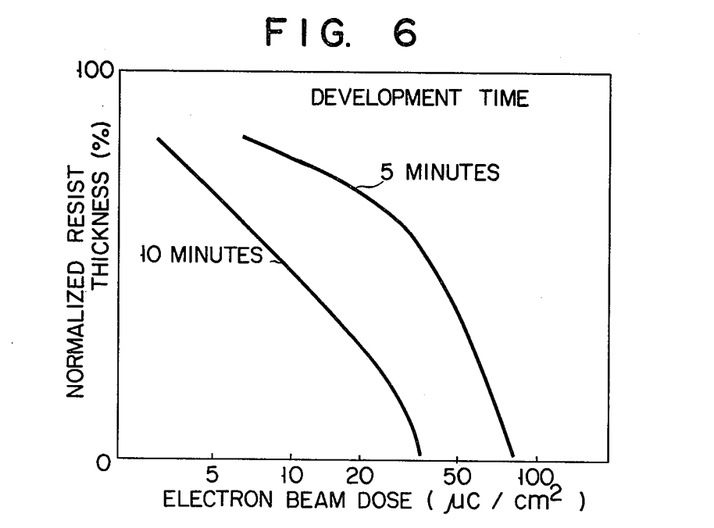
FIG. 6 is a graph showing the sensitivity curve when a film of conventional polyphenylmethacrylate is radiated with an electron beam and is developed.

In contrast with this, when the conventional polyphenylmethacrylate polymer resist material is developed in a weak developing solution consisting of 3 parts by volume of monochlorobenzene and 17 parts by volume of diisobutyl ketone for a long period of time, the resolution is significantly degraded as shown in FIG. 6. The resist material of the present invention has excellent effects because the dissolving rates in a solvent of the crosslinked part and the part decomposed by the electron beam are significantly different. The resist material of the present invention provides advantageous effects broadening the ranges of selection of the developing solution and the developing conditions.

EXAMPLE 2

A copolymer resist (containing 30 mol% of methacrylic acid; limiting viscosity number $[\eta]$ in 1,4-dioxane at 30° C. is 2.3) of the present invention analyzed by the proton NMR method was dissolved in a solvent (volume ratio of monochlorobenzene to isobutyl ketone = 1:1) to a concentration of about 7%. The resist solution was spin-coated to a thickness of about 0.9 μm on the thermally oxidized surface of a silicon wafer. The film thickness after pre-baking became 0.75 μm. The resist film was then radiated with an electron beam at a different dose and was immersed in a developing solution (volume ratio of 1,4-dioxane to diisobutyl ketone = 25:75) at room temperature for a predetermined time for development.

Figure 7:
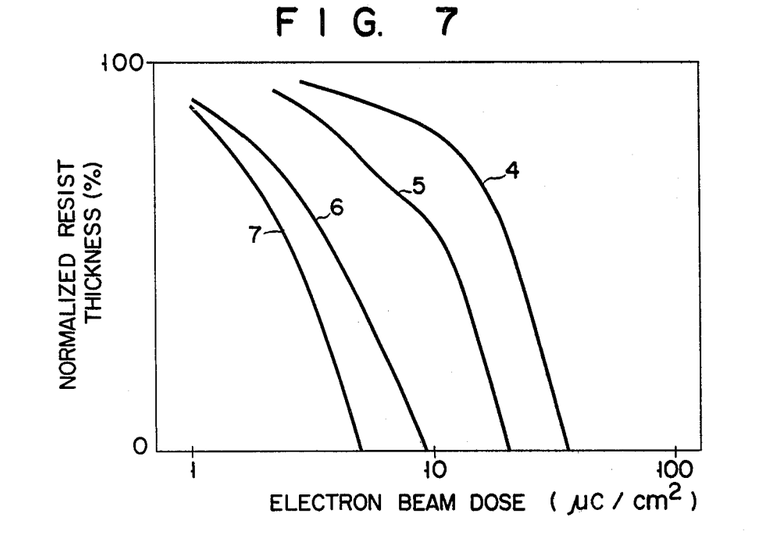
FIG. 7 is a graph showing the sensitivity curve obtained with the positive resist film formed according to the method of the present invention.

FIG. 7 shows sensitivity curves 4, 5, 6 and 7 which were obtained when the development time was 5, 10, 20 and 30 minutes, respectively. Swelling or deformation were not observed with the resist film even after development for 30 minutes, and a sensitivity of 5 μC/cm$^2$ and a γ (contrast as a resolution index) of 2.0 were obtained.

EXAMPLE 3

To a mixture of 30 parts by weight of refined phenylmethacrylate, 1 part by weight of methacrylic acid and 50 parts by weight of toluene was added 0.05% of azobisisobutyronitrile as the polymerization initiator based on the total weight of the homopolymers.

The mixture was treated and polymerized as same manner and conditions as example 1.

After the refinement of copolymer, the methacrylic acid composition of 10 mol% was determined by the proton-NMR analysis.

The copolymer (limiting viscosity number $[\eta]$ measured in 1,4-dioxane at 30° C. = 2.1; weight average molecular weight $\overline{M}w$ measured by gel permeation chromatography using a tetrahydrofuran solution = 2.9 × 10$^6$) was used for the resist of the present invention. After performing the application of the resist solution, pre-baking, radiation with an electron beam in the same manner as in Example 2, the resist film was developed in a developing solution (volume ratio of 1,4-dioxane to diisobutyl ketone = 15:85) at room temperature for 20 minutes. A sensitivity of 7 μC/cm$^2$ was obtained without pattern deformation.

EXAMPLE 4

To a mixture of 30 parts by weight of refined phenylmethacrylate, 6 parts by weight of methacrylic acid and 50 parts by weight of toluene was added 0.05% of azobisisobutyronitrile as the polymerization initiator based on the total weight of the homopolymers.

The mixture was treated and polymerized as same manner and conditions as example 1.

After the refinement of copolymer, the methacrylic acid composition of 40 mol% was determined by the proton-NMR analysis.

The copolymer (limiting viscosity number $[\eta] = 1.9$, $\overline{M}w = 1.5 \times 10^6$) was used for the resist of the present invention.

The copolymer was dissolved in 1,4-dioxane to a concentration of about 6%.

The resist solution was spin-coated to a thickness about 0.9 μm on the thermally oxidized silicon wafer. The film thickness after pre-baking at 200° C. for one hour became 0.7 μm.

The resist film was then radiated with an electron beam at a different dose and was immersed in a developing solution (volume ratio of 1,4-dioxane to diisobutyl ketone = 30:70) at room temperature for 30 minutes. A sensitivity of 8 μC/cm$^2$ was obtained without pattern deformation.

EXAMPLE 5

Using the same resist as in Example 2 above, a resist film was formed. The resist film thus obtained was pre-baked. Under different radiation widths and doses, the resist film was radiated by the electron beam. The resist film was then developed in a developing solution (volume ratio 1,4-dioxane to diisobutyl ketone = 25:75) for 6 minutes. The section of the resist film was then observed with a scanning electron microscope. The minimum dose of the electron beam corresponding to the radiation width at which the resist film was completely removed to expose the surface of the substrate with no pattern deformation, was determined. PMMA, which is known as a positive electron beam resist and has high resolution, was also subjected to the same procedure for the sake of comparison. The PMMA used was the commercially available Elvercite 2041 from du Pont, which was dissolved in a solvent mixture containing equal amounts of monochlorobenzene and methylisobutyl ketone by volume. The obtained resist solution was spin-coated and pre-baked at 170° C. for 30 minutes. The resist film thus formed was developed in a developing solution (volume ratio of methylisobutyl ketone to isopropyl alcohol=1:3) at 21° C. for 2 minutes: these are known as the standard developing conditions for PMMA.

Figure 8:
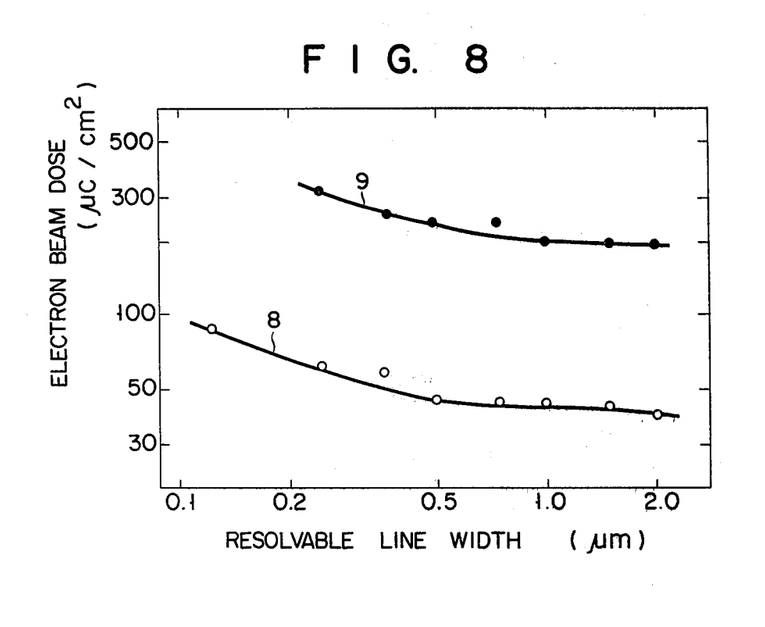
FIG. 8 is a graph showing the relationship between the electron beam dose and the resolvable line width obtained with the positive resist films formed by the method of the present invention and the conventional method, respectively.

FIG. 8 shows the radiation width which allows development and the minimum dose of the electron beam required to obtain this radiation width. Curve 8 corresponds to a copolymer resist of the present invention, and curve 9 corresponds to PMMA. When a developing solution (volume ratio of 1,4-dioxane to diisobutyl ketone=25:75), with which higher sensitivity may be obtainable with a higher mixing ratio of dioxane, was used for developing the resist film of the present invention, it was found that a radiation width of 0.125 μm can be developed at a sensitivity which is practically about five times that obtainable with the PMMA, as seen from FIG. 8.

EXAMPLE 6

The copolymer resist and the PMMA resist as used in Example 2 were spin-coated on surfaces of surface oxidized silicon wafers which were annealed at 800° C. for 4 hours and cooled to room temperature before use. Thereafter, the copolymer resist of the present invention was pre-baked at 200° C. for one hour, and the PMMA resist was pre-baked at 170° C. for 30 minutes. The resist film thickness after pre-baking was 0.7 μm in each case. The resist films were then radiated with an electron beam at a dose corresponding to a radiation width of 2.0 μm which allows developing as in Example 5 (FIG. 9). The radiation of the resist films with the electron beam was performed so that 100 square resist patterns of a predetermined side remained after developing. The resist film of the present invention was developed in a developing solution (volume ratio of 1,4-dioxane to diisobutyl ketone=25:75) for 6 minutes. The PMMA resist film was developed in a developing solution (volume ratio of methylisobutyl ketone to isopropyl alcohol=1:3) for 2 minutes. The resist patterns were observed with a scanning electron microscope. Table 2 shows the conditions of the square patterns of the resist films of different sizes. In general, a pattern having an area smaller than a certain level tends to fall off in the developing step if the resist does not exhibit a sufficient adhesivity to the substrate. Thus, it is possible to evaluate the adhesivity of the resist by the pattern size at which the pattern is peeled off first or by the number of residual patterns of the same size. As may be seen from Table 2, the copolymer resist of the present invention is superior to the conventional PMMA in adhesion to the substrate.

TABLE 2

|  | Length of side of square pattern | | | |
| --- | --- | --- | --- | --- |
|  | 1.5 μm | 1.0 μm | 0.75 μm | 0.5 μm |
| Copolymer resist of present invention | All patterns remained | All patterns remained | All patterns remained | All patterns remained |
| PMMA | All patterns remained | All patterns remained | 90% of patterns were separated | All patterns were separated |

EXAMPLE 7

Using the copolymer resist as in Example 3, a resist film was formed on the oxidized surface of a silicon wafer under the same conditions as in Example 3. After the resist film was pre-baked, the resist film was radiated with the electron beam in various patterns. The resist film was then developed in a developing solution (volume ratio of 1,4-dioxane to diisobutyl ketone is 25 to 75) for 6 minutes. The minimum electron dose corresponding to the patterns which exhibited good resolution is shown in Table 3 below.

Referring to Table 3, note that width refers to the remaining part of the resist which is not radiated with an electron beam, and pitch refers to the part of the resist removed by radiation of the electron beam, followed by developing.

In general, the proximity effect is gradually lowered as the area of the electron beam irradiated portion diminishes. Thus, the dose of electron beam is increased in accordance with decrease in the area of the irradiated portion. The large dose required by the through-hole pattern shown in Table 3 is accounted for by the above-noted effect.

TABLE 3

| Type of Pattern | Initial resist film thickness (μm) | Optimum dose of electron beam (μC/cm$^2$) |
| --- | --- | --- |
| Repetitive pattern of 1.0 μm width at 0.25 μm pitch | 0.7 | 70 |
| Repetitive pattern of 0.25 μm width at 10 μm pitch | 0.7 | 45 |
| Square through hole pattern of 0.4 μm in side length | 0.55 | 110 |
| Same as above | 0.7 | 140 |
| Square pattern of 0.25 μm in side length | 0.7 (Note 1) | 45 |

(Note 1) Thickness of the remaining film is about half the initial thickness.

A silicon dioxide substrate having the pattern shown in Table 3 was etched by carbon tetrafluoride containing 5% oxygen with a parallel flat plate-type reactive sputtering etching device. The etching conditions were a radio frequency of 13.56 MHz, a power of 150 W, a gas flow rate of 10 SCCM, a gas pressure of 60 m Torr, and an etching time of 7 minutes. The etching depth of the silicon dioxide substrate for the respective patterns was 2,300 Å, and the remaining film thickness of the copolymer resist of the present invention was 2,500 Å. No deformation of the copolymer resist pattern was observed by the etching mentioned above except the decrease of resist thickness. The remaining copolymer resist film was easily removed by plasma etching to provide a silicon oxide processed surface of high precision. Using PMMA, the reactive sputtering ashing was performed for the same pattern and under the same conditions. The decrease in the thickness of the PMMA resist film was 5,300 Å. The remaining PMMA pattern had considerable roughness and involved significant deformation. After the PMMA resist was removed, the silicon oxide pattern obtained was different from the resist pattern and was deformed.

If the phenymethacrylate-methacrylic acid copolymer of the present invention is developed in a solvent as a developing solution, which contains, as a good solvent, methyl cellosolve, isoamyl acetate, or a chlorine-containing solvent such as dichloroethyl ether, monochlorobenzene, dichlorobenzene, and 1,2-dichloroethane, a sensitivity which is about the same as obtained in Example 5 can be obtained. However, with the fine pattern as seen in Examples 5 and thereafter, the pattern edges are rounded, and a resist pattern of high aspect ratio (aspect ratio=pattern thickness/pattern width) cannot be formed.

The dissolution of the copolymer resist of the present invention in a solvent is similar to that of a polymethacrylic acid anhydride unlike the general polymethacrylic acid ester. Therefore, if 1,4-dioxane which is a polar solvent is used as a good solvent for the developing solution, the dissolution is facilitated by the synergetic action with the acid anhydride group, so that the selectivity of the molecular weight is improved and the developing may be accomplished with high resolution. The effects of the present invention may be obtained with a polar solvent of the same kind, such as tetrahydrofuran or dimethylformamide.

When the copolymer resist of the present invention is annealed by pre-baking, a polymer having a high glass transition point Tg and a high thermal decomposition point is obtained.

Table 4 below shows the glass transition point Tg and the thermal decomposition point of the copolymer resist of the present invention together with those of homopolymers.

TABLE 4

| Resist or polymer | Tg (°C.) | Thermal decomposition point (°C.) |
|---|---|---|
| Copolymer resist of present invention* (containing 30 mol % of methacrylic acid) | 142 | 362** |
| Copolymer resist of present invention(Note 1) (containing 10 mol % of methacrylic acid) | 135 | 350** |
| Polyphenylmethacrylate | 110 | 311*** |
| Polymethacrylic acid | 130 | — |
| PMMA | 104 | 225*** |

Note:
*Class transition point Tg is measured after pre-baking for 10 minutes.
**Temperature at which occurs the second weight reduction in FIG. 5.
***Temperature at which occurs the weight reduction in FIG. 5.
(Note 1)Thickness of the remaining film is about half the initial thickness.

When the copolymer resist of the present invention is pre-baked, it exhibits excellent thermal properties. Therefore, the swelling and deformation of the resist film in the developing solution are suppressed to the minimum, so that high resolution may be accomplished and deformation may not be caused at high temperatures for dry etching. This property particularly facilitates processing which requires high precision such as the lift-off step of metals having high melting points.

Since the copolymer resist of the present invention contains carboxylic acid, it has high affinity with silicon dioxide, silicon, chromium, dicromium trioxide and so on. Therefore, the copolymer resist of the present invention demonstrates excellent adhesion to the substrate, as was shown in Example 6 above. Especially with a fine pattern, when a resist of poor adhesion is used, flow or deformation of the pattern tends to occur since the adhesion area of the pattern with the substrate is small. However, with the copolymer resist of the present invention, formation of fine patterns in the order of submicrons may be facilitated.

What is claimed is:

1. A method of forming a pattern of a positive resist comprising:
   (a) forming on a substrate a film of a positive resist consisting essentially of a copolymer having 60 to 90 mol% of phenylmethacrylate and 40 to 10 mol% of methacrylic acid;
   (b) heating said positive resist film to cross-link said copolymer;
   (c) selectively radiating said heated positive resist film with a high energy beam selected from the group consisting of an electron beam and X-rays to thereby form a latent image; and
   (d) developing said latent image with a developing solution which has a strong ability to dissolve said resist.

2. The method of claim 1, wherein said developing solution is a mixture of a good developing solvent and a poor developing solvent.

3. The method of claim 2, wherein said good solvent is selected from the group consisting of 1,4-dioxane, tetrahydrofuran, dimethylformamide, monochlorobenzene, dichloroethyl ether, isoamyl acetate, and methyl cellosolve; and said poor solvent is selected from the group consisting of diisobutyl ketone and n-hexane.

4. The method of claim 1, wherein the step of heating is conducted at a temperature of at least 200° C.

5. The method of claim 1, wherein said positive resist comprises a copolymer of about 70 mol% of phenyl methacrylate and about 30 mol% of methacrylic acid.

6. The method of claim 1, wherein said developing solution is a mixture of monochlorobenzene and diisobutyl ketone.

7. The method of claim 1, wherein said developing solution is a mixture of 1,4-dioxane and diisobutyl ketone.

8. A method of forming a pattern of a positive resist comprising:
   (a) forming on a substrate a film of a positive resist which consists essentially of a copolymer having 60 to 90 mol% of phenylmethacrylate and 40 to 10 mol% of methacrylic acid;
   (b) heating said positive resist film at a temperature of at least 200° C. to thereby cross-link said copolymer;
   (c) selectively radiating said heated positive resist film with a high energy beam selected from the group consisting of an electron beam and X-rays to thereby form a latent image; and
   (d) developing said latent image in a developing solution consisting essentially of a first solvent and a second solvent, said first solvent selected from the group consisting of 1,4-dioxane, tetrahydrofuran, dimethylformamide, monochlorobenzene, dichloroethyl ether, isoamyl acetate, and methyl cellosolve, said second solvent selected from the group consisting of diisobutyl ketone and n-hexane.

9. The method of claim 8, wherein said positive resist comprises a copolymer of about 70 mol% of phenyl methacrylate and about 30 mol% of methacrylic acid.

10. The method of claim 8, wherein said solution is a mixture of monochlorobenzene and diisobutyl ketone.

11. The method of claim 8, wherein said solution is a mixture of 1,4-dioxane and diisobutyl ketone.

* * * * *